D. ALLDREAD.
CROSS HEAD.
APPLICATION FILED JUNE 25, 1917.

1,265,027.

Patented May 7, 1918.

WITNESSES

INVENTOR
David Alldread,
BY
ATTORNEY

UNITED STATES PATENT OFFICE.

DAVID ALLDREAD, OF BAY CITY, MICHIGAN.

CROSS-HEAD.

1,265,027.

Specification of Letters Patent.

Patented May 7, 1918.

Application filed June 26, 1917. Serial No. 177,064.

*To all whom it may concern:*

Be it known that I, DAVID ALLDREAD, a citizen of the United States, residing at Bay City, in the county of Bay and State of Michigan, have invented a new and useful Cross-Head, of which the following is a specification.

The invention relates to cross heads, and more particularly to the class of anti-friction cross heads for use with stationary engines, locomotives or the like.

The primary object of the invention is the provision of a cross head of this character, wherein the employment of a brass slide or gib is entirely eliminated, and in lieu thereof is an anti-friction structure, the same being adaptable for use with various types of engines, without necessitating any changes or alterations therein, with resultant perfect movement of the main and piston rods.

Another object of the invention is the provision of a cross head of this character wherein a block and roller bearings are carried thereby, the block and bearings being made from case-hardened steel to minimize wear and thereby rendering the cross head comparatively inexpensive and of maximum strength and durability.

A further object of the invention is the provision of a cross head of this character wherein the construction thereof is novel in form to assure the changing of parts in event of wear without necessitating the taking down of the main or piston rods or the disassemblage of all of the adjunct parts of the cross head and guide.

A still further object of the invention is the provision of a cross head of this character wherein in event of wear, the lost motion can be eliminated on adjustment or substitution of new parts without excessive labor in the disassembling and assembling of the cross head.

Other objects will be in part obvious and in part hereinafter pointed out.

The invention accordingly consists in the features of construction, combination of elements and arrangement of parts, which will be exemplified in the construction hereinafter set forth and the scope of the application of which will be indicated in the appended claims.

In the accompanying drawing.

Similar reference characters designate like parts throughout the several figures.

Figure 1:
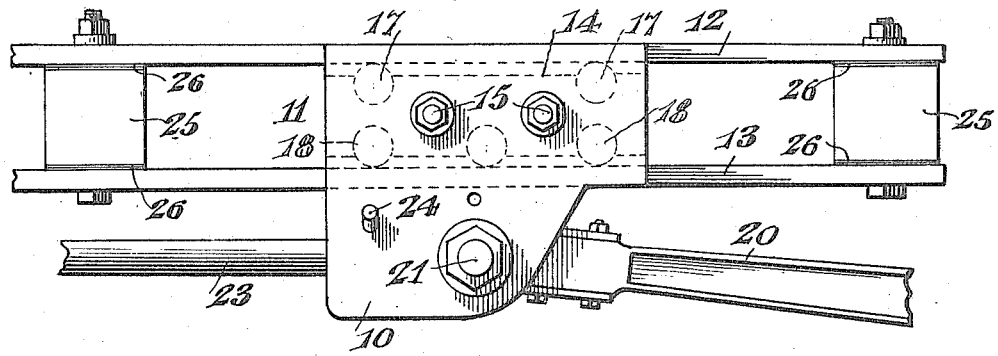
Figure 1 is a side elevation of a cross head constructed in accordance with the invention.

Referring to the drawing in detail, 10 designates the lower portion of the body of the cross head which has integral therewith, spaced parallel side cheeks 11, which provide therebetween a suitable recess and these cheeks are disposed on opposite sides of guides 12 and 13 respectively, of the ordinary well known construction employed with stationary engines or locomotives.

Figure 2:
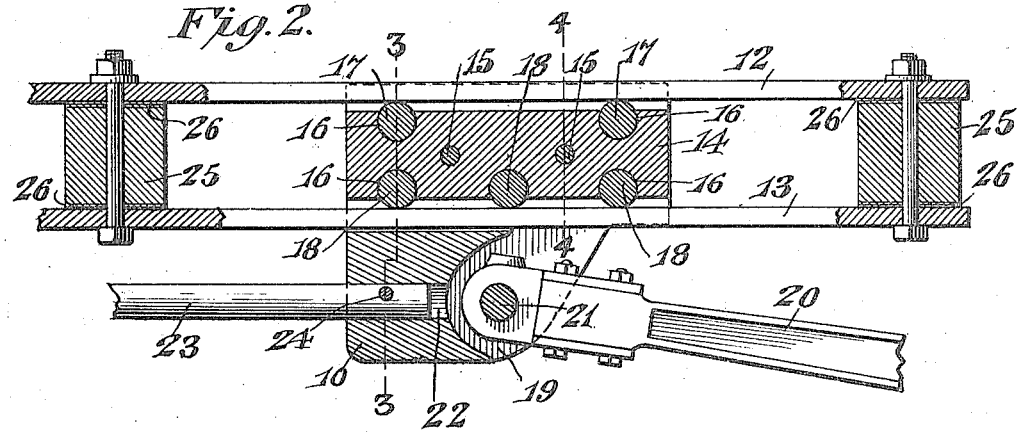
Fig. 2 is a sectional elevation of the cross head, showing the guide therefor partly in section with the liners in place.
Figure 3:
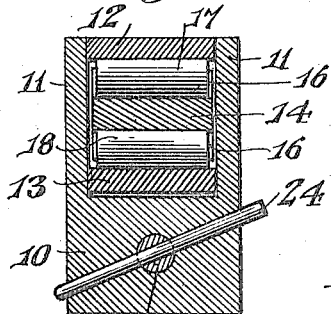
Fig. 3 is a sectional view on the line 3—3 of Fig. 2.
Figure 4:
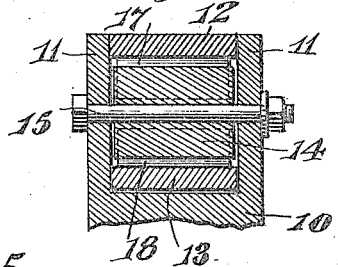
Fig. 4 is a sectional view on the line 4—4 of Fig. 2.
Figure 5:
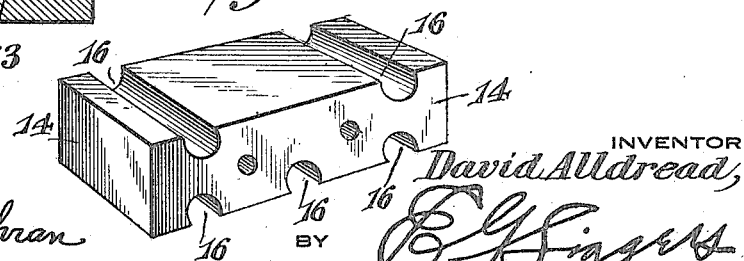
Fig. 5 is a perspective view of the roller bearing block detached from the cross head.

Removably fitted between the side cheeks 11 of the cross head to occupy the recess therein is a block 14 preferably made from case-hardened steel and in this instance, is of a length corresponding to the length of the side cheeks 11 of said cross head, although the block may be made from several sections or any length required. The block 14 is detachably fastened to be disposed between the guides 12 and 13, as shown in Figs. 1 and 2 of the drawings, through the medium of transverse bolts 15, which are passed through the side cheeks 11 of the cross head and also pass through said block 14, the bolts being readily removable to permit the detachment of the block 14 when the occasion requires.

The block 14 in its top and bottom faces are formed with transversely disposed channels or grooves 16 for accommodating the upper and lower series of anti-friction bearing rollers 17 and 18 respectively, which travel upon the inner faces of the guides 12 and 13 on the reciprocation of the cross head to minimize friction and excessive wear in the operation of the cross head. The bearing rollers 17 and 18 are preferably made from case-hardened steel, thereby eliminating the use in the cross head of a slide or gib made from brass, as usual, and thus in the use of the block 14 and the bearings 17 and 18 a cross head is provided of an extremely simple and comparatively inexpensive construction possessing maximum strength and durability and adapted to lessen the friction and also avoiding undue or excessive labor in applying or removing the cross head.

The cross head in the lower portion 10 thereof is provided with the recess 19 for the reception of the front end of the main rod 20 and the sides of the recess has fitted therein the cross head pin 21 for pivoting the main rod to the cross head, as usual. The recess 19 is located at the rear end of the portion 10 of the cross head while fitted in the front end in a suitable socket 22 therein is the piston rod 23 and the latter is drawn to its proper position by a key 24 which is wedge-shaped and pierces the portion 10 diagonally to intersect the socket 22 and engage in the piston rod. It will be apparent that the piston rod 23 can be readily removed on the withdrawal of the key 24 from the cross head.

Arranged between the guides 12 and 13 and the spacer members 25 therefor are liners 26 which can be removed to bring the guides closer together to take up slack resultant from wear on said guides or the wear of the bearing rollers 17 and 18 in the cross head.

On removing the bolts 15, the block 14 is freed from the cross head and by lowering the portion 10 of the cross head, said block can be withdrawn from between the guides 12 and 13 to extract the bearing rollers 17 and 18 from the block should said bearings become severely worn and unfit for further use, so that new bearings can be substituted and the necessity of detaching the main rod 20 from the cross head in this event is eliminated. It is, of course, to be understood that any number of bearing rollers 17 and 18 can be employed and the length thereof varied should the occasion require.

In the use of the cross head constructed as hereinbefore described trueness of movement thereof is assured without undue play and in event of required play between the bearing rollers and the guides, the latter can be adjusted by the liners 26, disposed between the spaces 25 and said guides 12 and 13 respectively, the liners 26 being detachable for such adjustment.

The side cheeks 11 of the cross head serve as end walls for the channels 16 when the block 14 is placed therebetween and said channels contain the bearing rollers 17 and 18, so that the latter are prevented from undue endwise movement, the bearing rollers 17 being approximately the length of the channels 16 in the block 14 yet said bearing rollers may be varied in length if found desirable. The side cheeks 11 prevent any possibility of the bearing rollers from working out of place when the cross head is active between the guides, and it will be apparent that said bearing rollers 17 and 18 can be inserted in the seats 16 in the block 14 from either side thereof.

It is to be understood that the side cheeks 11 in lieu of their integral formation with the portion 10 of the cross head may be separable therefrom and this is contemplated within the scope of the invention.

From the foregoing, it is thought that the construction, manner of operation and advantages of the invention will be clearly understood and therefore a more extended explanation has been omited.

What is claimed is:—

1. The combination with cross head guides, of a cross head having a body portion provided with spaced parallel side cheeks disposed at opposite sides of the guides, a block detachably fitted between the side cheeks and said guides and having transversely disposed channels in the top and bottom faces thereof, bearing rollers journaled in the channels and movable upon the guides, said cheeks serving to contact with the cross head guides, and closing the ends of the channels to retain the rollers therein.

2. The combination with cross head guides, of a cross head provided with a recess for receiving said guides, a block removably fitted within the recess, and bearing rollers carried by the block and movable over the guides.

3. The combination with cross head guides, of a cross head movable relative to the guides, a block disposed between the guides and detachably supported within the cross head, and upper and lower series of bearing rollers journaled in the block and traversable over the guides at the inner faces thereof.

In testimony that I claim the foregoing as my own I have hereto affixed my signature in the presence of two witnesses.

DAVID ALLDREAD.

Witnesses:
VICTOR SPIKE,
J. ERNEST CONVERSE.